(12) United States Patent
Heinonen et al.

(10) Patent No.: US 8,307,202 B2
(45) Date of Patent: Nov. 6, 2012

(54) METHODS AND SYSTEMS FOR USING PKCS REGISTRATION ON MOBILE ENVIRONMENT

(75) Inventors: Petteri Heinonen, Espoo (FI); Michael Alexander Webster, Helsinki (FI); Juha Lindström, Espoo (FI)

(73) Assignee: Valimo Wireless Oy, Helsinki (FI)

( * ) Notice: Subject to any disclaimer, the term of this patent is extended or adjusted under 35 U.S.C. 154(b) by 1162 days.

(21) Appl. No.: 11/977,421

(22) Filed: Oct. 23, 2007

(65) Prior Publication Data

US 2008/0170697 A1 Jul. 17, 2008

(30) Foreign Application Priority Data

Oct. 23, 2006 (FI) .................................... 20060930

(51) Int. Cl.
*H04L 29/06* (2006.01)
(52) U.S. Cl. .......................... 713/156; 380/270
(58) Field of Classification Search .................. 713/155, 713/156, 185, 175, 182, 168, 170, 176; 380/277, 380/278, 282, 283
See application file for complete search history.

(56) References Cited

U.S. PATENT DOCUMENTS

| | | |
|---|---|---|
| 2002/0144109 A1 | 10/2002 | Benantar et al. |
| 2003/0115456 A1 | 6/2003 | Kapoor |
| 2007/0150737 A1* | 6/2007 | Parupudi et al. .............. 713/175 |
| 2008/0022103 A1* | 1/2008 | Brown et al. .................. 713/175 |

FOREIGN PATENT DOCUMENTS

EP 1162781 12/2001

OTHER PUBLICATIONS

Yong Lee et al, A lightweight and secure wireless certificate management protocol supporting mobile phone, Feb. 27, 2006, INSPEC, pp. 103-104.*
RSA Laboratories, PKCS #10 v1.7: certficiation Request Syntax Standard, May 26, 2000, RSA Laboratories, pp. 1-10.*
Yong Lee, et al.; "A Lightweight and Secure Wireless Certificate Management Protocol Supporting Mobile Phone;" Consumer Electronics, 2006; ICCE '06; 2006 Digest of Technical Papers; International Conference in Las Vegas, NV, Jan. 7-11, 2006; pp. 103-104.

(Continued)

*Primary Examiner* — Gilberto Barron, Jr.
*Assistant Examiner* — Izunna Okeke
(74) *Attorney, Agent, or Firm* — Ware, Fressola, Van Der Sluys & Adolphson LLP

(57) ABSTRACT

The invention relates to method and system for using PKCS and especially PKCS#10 registration standard on a mobile environment and in particularly in a WPKI (Wireless PKI) environment comprising a registration server and a client provided with a key pair is provided only with a part of the certificate request info defined on the PKCS registration standard. A PKCS registration structure is formed by the client of said part of the certificate request info and the public key to be registered, after which a verifying code is determined using at least part of said formed PKCS registration structure. Finally said verifying code and the public key are delivered to the registration server advantageously without delivering said part of the certificate request info received at first by the client.

27 Claims, 2 Drawing Sheets

OTHER PUBLICATIONS

Sungduk Kim, et al; "An Efficient POP Protocol Based on the Signcryption Scheme for the WAP PKI;" Proceedings of Third European PKI Workshop, Public Key Infrastructure—Theory and Practice, Europki 2006; Turin, Italy; vol. 4043, Jun. 2006; pp. 223-232; sections 4.2 and 4.3.

Y. H. Yoon, et al; Wireless Internet X.509 Public Key Infrastructure Certificate Request Message Format and Protocol (WCRMFP); IETF Standard Working Draft; Internet Engineering Task Force, IETF; No. 1; May 2002; section 2, appendix B-3.

PKCS #10 v1.7: Certification Request Syntax Standard, RSA Laboratories, May 26, 2000, pp. 1-10.

Yong Lee, et al.; "Design and implementation of wireless PKI technology suitable for mobile phone in mobile-commerce"; Computer Communications 30 (2007), pp. 893-903; 2006 Elsevier B.V.; available online Nov. 27, 2006.

\* cited by examiner

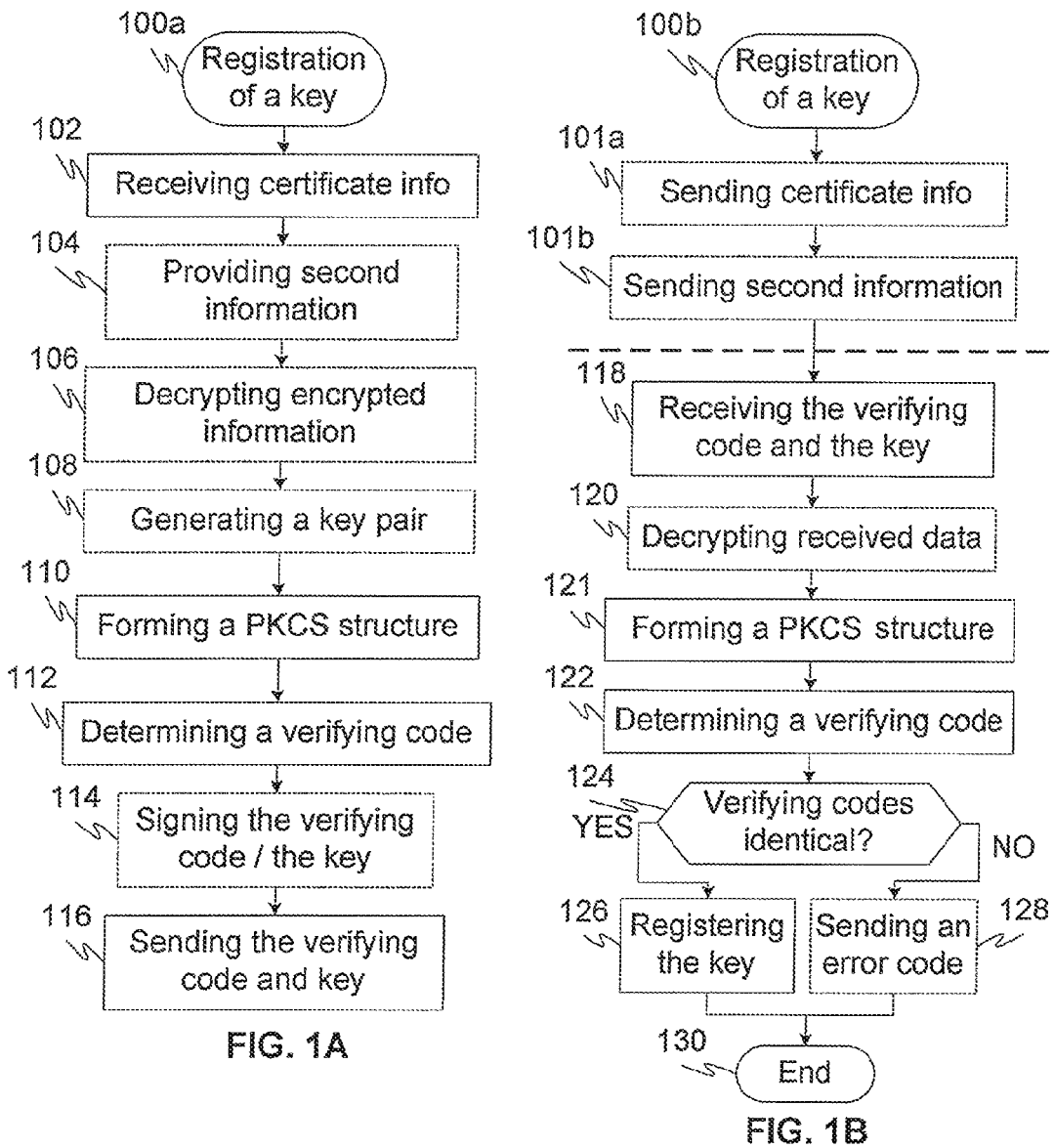
FIG. 1A
FIG. 1B
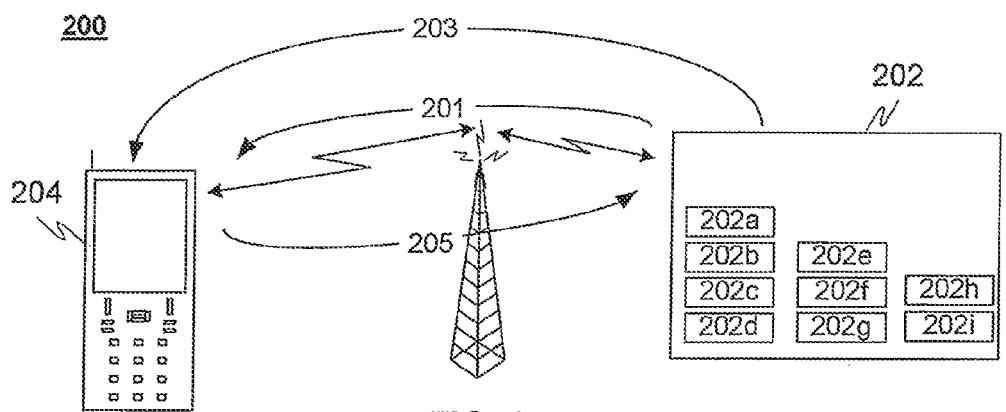
FIG. 2

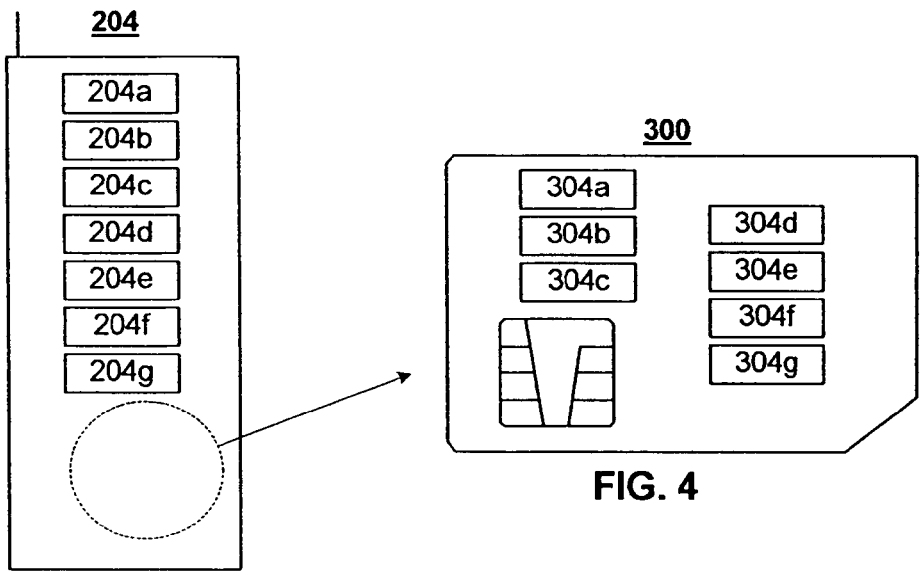
FIG. 3
FIG. 4
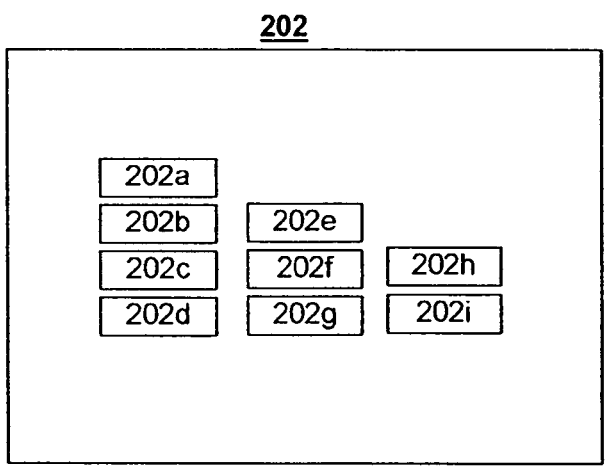
FIG. 5 (Server)
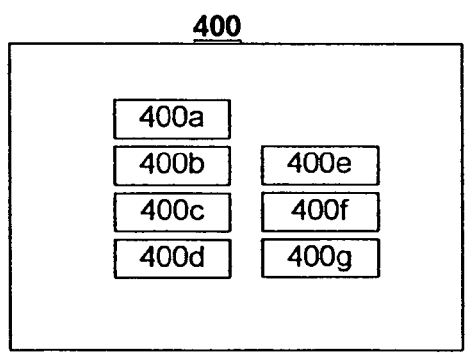
FIG. 6A (for a terminal)
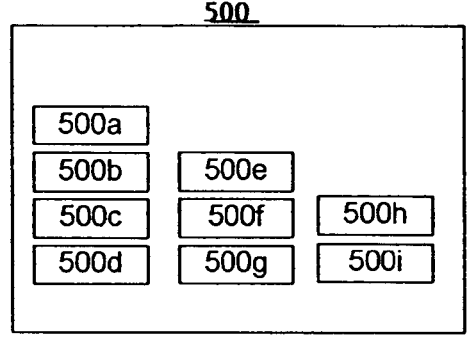
FIG. 6B (for a server)

METHODS AND SYSTEMS FOR USING PKCS REGISTRATION ON MOBILE ENVIRONMENT

CROSS-REFERENCE TO RELATED APPLICATIONS

This application claims priority under Section 119 to Finnish Patent Application No. 20060930 which was filed on Oct. 23, 2006.

TECHNICAL FIELD OF THE INVENTION

The invention relates to method and system for using PKCS registration on a mobile environment and especially in a WPKI (Wireless PKI) environment comprising a registration server and a client, such as a terminal. In particularly the invention relates to a registration method, where a registration request for a public key of a key pair generated in the terminal is provided to the registration server in order to be registered using PKCS structure, in particularly PKCS#10 structure. Still the invention is applicable not only for keys generated on the terminal, SIM, UICC, or hardware module (tamper resistance), but also for pre-generated keys, such as keys stored during manufacturing or personalization of the terminal, SIM, UICC, and/or hardware module (client).

BACKGROUND OF THE INVENTION

In order to being identified in a WPKI (Wireless PKI) environment a user should have a certain identification certificate including PKI public key (and corresponding private key stored securely) used for signing and opening messages sent by the user, for example. It is known from the prior art to provide a PKI key pair beforehand for example by a manufacturer of the terminal, or SIM/UICC-card (SIM stands for Subscriber Identity Module, and UICC for Universal Integrated Circuit Card) of the terminal, if the key pair of SIM/UICC-card is used, as well also to generate keys "on-board". It is also known to use secured transmission path between the OTA server (Over The Air) and SIM-card when delivering a key pair to the SIM-card. When the manufacturer generates the key pair or just a key (private PKI key or a symmetric key), the public key of the key pair can be registered and connected to the user identification information reliably when the user is known when the key pair is stored in his/her terminal or the terminal with the key pair is given to the user, for example.

However, nowadays situations where a PKI key pair should be generated by a client, such as a terminal or by some component in the terminal (such as SIM/UICC-card) not until needed are become more general, such as also situations where pre-generated keys are not registered until need. To be reliable the public key of the generated key pair should be registered or certified with a certification authority, such as a mobile operator, bank or government agency.

In the prior art for example special standards are known, such as the Public-Key Cryptography Standards (PKCS), which are specifications produced by RSA Laboratories in cooperation with secure systems developers worldwide for the purpose of accelerating the deployment of public-key cryptography. Especially a PKCS#10 (Certification Request Syntax Standard) describes syntax for a request for certification of a public key, a name, and possibly a set of attributes. It is known from the prior art to use the PKCS#10 standard to register or certificate a public key generated by a terminal with a registration server, such as the registration server of a certification authority.

There are, however, some disadvantages in the prior art solutions, namely at first in a certain prior art solution only a generated public key is returned, whereupon one cannot be sure whether the public key is the original public key generated by the terminal assumed, or is s message that has been tampered with. Secondly the public key cannot be put to a standard PKCS#10 self signed format, because it is missing the signature. Moreover if the whole PKCS#10 structure is returned, it takes a lot of SMS messages to be sent between the registering server and the terminal and therefore requires a lot of data transfer capacity of the transmission system. In addition if all the information is returned as PKCS#10 structure the returning channel needs to be secured end-to-end by authentication and encryption, which is not always possible especially in a mobile environment.

SUMMARY OF THE INVENTION

An object of the invention is to provide a method and system for a standard PKCS registration process for a public key which registration is requested by a client on a communication channel that has limited data capacity and where security could also be limited. Especially the object of the invention is to minimize an amount of SMS messages used for PKCS registration process when using SIM/UICC-card (or the like) in a mobile environment and especially in a WPKI environment comprising a registration server and terminal.

The object of the invention is fulfilled by providing a client requesting a registration of a key pair only with a part of the certificate request info defined on the PKCS registration standard, forming by the client a standard PKCS structure of said part of the certificate request info received and of the public key to be registered or at least information relating to said public key to be registered, using at least part of said formed standard PKCS registration structure formed for determining a verifying code, and delivering said verifying code and the public key to said registration server advantageously without delivering said part of the certificate request info received at first by the client.

The present invention relates to a method and system. In addition the present invention relates to a registration server, terminal, and a computer program product.

In this document a client means a terminal, or, SIM, UICC, or hardware module (like trusted flash or embedded chip), which is tamper resistance and/or tamper proof, or other tamper resistance means typically used in the terminal. Moreover it should be noted that a key or key pair to be registered is generated by the client ("on-board"), but the key or key pair could also be pre-generated apart from the client, such as by the manufacturer of the client (terminal, SIM, UICC or hardware module) after which the client is provided with the pre-generated key and/or keys and finally, when needed, a registration of the key (and/or keys) is requested by said client. The client may also be implemented by a circuit or computer program product comprising software code means typically run on the terminal, such as on a computer or a mobile phone.

In more details a public key of a key pair (including private and public keys) by which the client is provided must be registered at a registration server of a certification authority, for example. The registration server advantageously sends part of the certificate request info defined on the PKCS to the client usable for forming a standard PKCS registration structure. Both parties (the client and registration server ends) know how to add the rest of the information to the certificate request info in order to make it whole.

It should be noted that advantageously only part of said certificate request info is delivered to the client in order to minimize data to be delivered. According to an embodiment of the invention at least part of the certificate request info or the request is encrypted before sending. Encrypting is advantageously done using a client's public key, where the public key has been provided for the client beforehand for example by a manufacturer of the client, such as a terminal, or SIM/UICC-card, or by an operator. Encryption is also typically done using asymmetric keys, and for example RSA-algorithm. Moreover the certificate request info is advantageously sent via a first data communication connection established between the registration server and client.

When said certificate request info is received a possible encrypted part of it is decrypted by said client using it's private key, after which a standard PKCS registration structure is formed by the client using at least portion of said part of the request info received from the registration server and the public key to be registered. However, it is also possible to use the whole of said certificate request info received, and/or only relevant part of the public key information of the public key to be registered.

After forming said PKCS registration structure a verifying code is determined over said standard PKCS registration structure. It is also possible to use only relevant portions of said PKCS structure over which the verifying code is determined. The determined verifying code as well as the public key to be registered can be signed by the client, after which the verifying code and the public key are delivered to said registration server. The verifying code, which is advantageously a hash code of the combination, is advantageously determined using a one-way algorithm, such as a SHA-1 or SHA-2, MD5, RIPEMD, RIPEMD-160, (RIPEMD-128, RIPEMD-256, and RIPEMD-320), Tiger, or WHIRLPOOL algorithm.

In addition, second information (such as a challenge password and/or environment data of the client such as ICCID (Integrated Circuit Card ID) read from the card) may also be used for forming said standard PKCS structure, where the environment data is advantageously also known by said registration server. Said second information used for forming the standard PKCS structure may also be information delivered to the client via a second connection separated from a data communication connection used for delivering said part of the certificate request info to the terminal. Second information may be proof of possession or a challenge password, but may also be any other information, such as a random character string known also by the registration server. According to an embodiment of the invention said second information may be a combination of at least data or information described above, such as combination of environment data and information sent by the registration server. In addition said second information or at least part of it can contain Luhn checksum or any other checksum and local validity check of the second information can be done.

Said verifying code and the public key (and possible second information) are then received and a standard PKCS registration structure is further formed in the registration server, which also knows said portion of said part of the request info used in the terminal for forming said standard PKCS registration structure, as well as said second information (if used). So the registration server forms a standard PKCS registration structure also by itself using said portion of said part of the request info used by the client for forming the standard PKCS registration structure and the received public key generated by the client, after which the registration server determines a verifying code over the same portion of said standard PKCS registration structure formed in the registration server as is used by the client. When the registration server has determine the verifying code, is compares it to the verifying code received from the client, and if these two are identical, the public key is registered in the registration server.

In the invention the client is a SIM-card, UICC-card, tamper resistance means, or a terminal, where the terminal is advantageously a mobile phone or portable computer comprising a SIM-card, UICC-card and/or tamper resistance means. The key pair can be generated for example in the terminal by using terminal's means adapted to this generation or on the SIM and/or UICC-card of the terminal.

The verifying code can be signed by the client before sending to the registration server, as disclosed earlier in this document. According to an advantageous embodiment of the invention the verifying code is signed by the private key of the key pair which public key is on said PKCS registration structure.

According to a further embodiment of the invention a certain time window is triggered during which the verifying code and the public key to be registered must be received in the registration server in order to be registered. Otherwise the registration request is automatically refused in the registration server. The delivery of the part of the certificate request info can be used for triggering the certain time window, for example.

By sending only the verifying code and public key instead of sending a whole PKCS registration structure and/or second information a loading of a communication system used for data transmission between the client and registration server can be reduced remarkably. Also a much simpler calculation in the terminal or client can be achieved, because all the operations to calculate an ASN.1 structure is done in the registration server instead of the client or terminal or SIM/UICC, which can not really do all these operations. [ASN.1 (Abstract Syntax Notation One) is a standard and flexible notation that describes data structures for representing, encoding, transmitting, and decoding data]

It should also be noted that when part of the certificate request info (and possibly also second information) is encrypted before delivering to the client third parties can't determine the verifying code as determined by the client because they do not have said certificate request info and/or second information with the public key, over which the verifying code is determined by the client.

For example if the third party wants to send his/her key to the registration server by stealing the verifying code and public key of the original user, and replacing the public key of the original user by his/her own public key, the registration server will recognize this because verifying codes wouldn't be identical, namely the verifying code determined by the registration server using part of the certificate request info and possible second information with the public key of the third party would not be identical to the verifying code determined by the client. On the other hand if the third party determines a new verifying code using his/her public key, the registration server will still recognize this because the third party does not have certificate request info and second information used for determination of the verifying code by the client. This is an additional reason why the certificate request info and possible second information are not delivered with the verifying code and/or public key to the registration server.

According to an embodiment of the invention also information gathered from the environment of the client can be used as second information or at least part of second information when determining a verifying code, such as client's serial number, information of an application or computer program product run on the terminal and/or information of SIM/UICC-card of the terminal and/or IMEI and/or IMSI and/or processor's ID number and/or terminal's uniquely identifying code and/or ICCID. A possibility is also to ask certain information from the user of the terminal. However, information above should also be known by the registration server in order to determine correct verifying code. Some information, which is not know to the registration server beforehand needs also to be transmitted from client to the registration server on the $3^{rd}$ communication or using some other means.

According to an embodiment of the invention a PIN-code can be asked from the user in order to activate decryption/encryption/signing processes, or generation of a new key pair. In an embodiment the PIN-code can also be taken into account when determining a verifying code.

Moreover it should be noted that even if this document states a client like a terminal used for generating and/or at least requesting a registration of a key pair and determining a verifying code, also a computer program product run on the terminal may perform these steps according to an embodiment of the invention. The computer program product is advantageously stored or at least performed at least partly on a SIM and/or UICC-card of the terminal. According to a further embodiment of the invention also SIM and/or UICC-card of the terminal can be at least partly used for generating and/or at least requesting a registration of a key pair and determining a verifying code over the certificate request info portions, possible second information and a key to be registered.

The present invention offers remarkable advantages over the known prior art solutions, because using the invention one can generate new PKI key pairs and register them at anytime needed, or request a registration of pre-generated key, without a great fear about the Man-In-The-Middle attacks. In addition the invention makes possible to reduce a loading of used communication systems, because only a verifying code and public key is needed to deliver, not the whole PKCS#10 structure. Furthermore the invention is also powerful even if communication connections between a client and registration server is unsecured. In other words the invention enables the registration to be performed using PKCS registration standard self signed structure without returning PKCS structure to the registration server.

BRIEF DESCRIPTION OF THE DRAWINGS

Next the invention will be described in greater detail with reference to exemplary embodiments in accordance with the accompanying drawings, in which FIG. 1A illustrates a flow chart of an exemplary method for forming a registration request in a terminal according to an advantageous embodiment of the invention, FIG. 1B illustrates flow chart of an exemplary method for registering a key in a registration server according to an advantageous embodiment of the invention, FIG. 2 illustrates a block diagram of an exemplary system for a key registration process in a WPKI environment comprising a registration server and a terminal according to an advantageous embodiment of the invention, FIG. 3 illustrates an exemplary terminal for a key registration process in a WPKI environment according to an advantageous embodiment of the invention, FIG. 4 illustrates an exemplary SIM/UICC-card for a key registration process in a WPKI environment according to an advantageous embodiment of the invention, FIG. 5 illustrates a block diagram of an exemplary registration server for registering a key according to an advantageous embodiment of the invention, FIG. 6A illustrates a block diagram of an exemplary computer program product for forming a registration request in a terminal according to an advantageous embodiment of the invention, and FIG. 6B illustrates a block diagram of an exemplary computer program product for registering a key in a registration server according to an advantageous embodiment of the invention.

DETAILED DESCRIPTION

FIG. 1A illustrates a flow chart of an exemplary method 100a for forming a registration request in a terminal (as a client) according to an advantageous embodiment of the invention, where at step 102 (only) part of the certificate request info defined on the PKCS registration standard is received advantageously via a first data communication connection, and at step 104 second information is received or alternatively gathered from the environment of the terminal. The step 104 is, however, optional. At step 106 encrypted parts of information are decrypted, if there is any encrypted information received in step 102 and/or 104. At step 108 a PKI key pair including a private and public keys may be generated, if they are not already pre-generated beforehand either by the terminal or alternatively some other part. Now it should be noted that the order of steps 102-108 described here is only an example and the order may also be different, such as first providing second information, next generating the key pair and after this receiving certificate request info, for example, whereupon the step 108 could also be optional. However, after the steps 102-108 said part of the certificate request info and possible second information with the public key (PKI) to be registered is put on the PKCS structure at step 110 in order to form a PKCS structure according to a PKCS registration standard. It should be noted that only relevant information that is needed is put into the PKCS structure at step 110.

At step 112 a verifying code, such as a hash code, is determined over the (at least part of) formed PKCS structure including the key to be registered, whereafter at step 114 the verifying code can be signed by the generated or pre-generated key, which public key to be registered is delivered to the registration server. However, the step 114 is optional. When the verifying code is determined, it is delivered advantageously with the public key to be registered to a registration server of a certification authority at step 116.

FIG. 1B illustrates flow chart of an exemplary method 100b for registering a key in a registration server according to an advantageous embodiment of the invention, where at step 101a (only) part of the certificate request info defined on the PKCS registration standard and step 101b second information is sent to a terminal. These steps are however optional, because according to an embodiment of the invention also some other party may provide the terminal with said first and/or second information, and according to an embodiment of the invention said second information may also be information gathered by the terminal from it's environment. Moreover the order of the steps 101a, 101b may be different from that described here.

After step 116 depicted in FIG. 1A the verifying code and the key to be registered is received in step 118, after which the possible encryption of the verifying code and/or the key to be registered is decrypted, or the possible signature is verified at step 120. Also the step 120 is optional.

When the registration server has received said verifying code, the registration server forms at step 121 a PKCS structure putting same certificate request info and possible second information as the terminal did with the public key received from the terminal on the PKCS structure in order to form a PKCS structure according to a PKCS registration standard, after which it determines at step 122 a verifying code over the (at least part of) formed PKCS structure including the key to be registered (as the terminal did). It should be noted that the registration server must know the method how to prepare a PKCS structure, what information should be used and how to determine the verifying code, so the similar method as the terminal has used.

At step 124 the verifying codes (the first one sent by the terminal and the second one determined by the registration server) are compared. If they are identical, the registration server can be sure that the public key to be registered is indeed from the terminal to which said first and second information were sent, whereupon the public key is registered at step 126 and the process is ended 130. If the verifying codes are not identical, an error code is advantageously sent to the terminal at step 128 (this is however optional) and the process ended 130.

FIG. 2 illustrates a block diagram of an exemplary system 200 according to an advantageous embodiment of the invention for a key registration process in a WPKI environment comprising a registration server 202 being in data communication via a first data communication connection 201 with a terminal 204.

Part of the certificate request info defined on the PKCS registration standard and usable for forming a registration request is sent from the registration server 202 via said first data communication connection 201 to the terminal 204. Second information (or at least part of it) used for forming the registration request and known also by the registration server 202 may also be provided to the terminal 204 according to an embodiment of the invention via a second connection 203 separated from the first data communication connection 201, but this is optional. However, a transmission path used for second data can be same as used for first data, but first and second data is not sent during same connection.

A verifying code (determined in the terminal of said part of the certificate request info and possible second information with a public key to be registered) and the public key are delivered to the registration server 202 via a third communication connection 205, which is according to an embodiment of the invention a different connection than the connection 201 used for delivering said first information. However, a transmission path used for delivering the verifying code and the key can be the same as used for the first data.

FIG. 3 illustrates an exemplary terminal 204 for a key registration process in a WPKI environment according to an advantageous embodiment of the invention, where the terminal comprises means 204a for receiving (only) part of the certificate request info defined on the PKCS registration standard and means 204b for receiving and/or gathering second information, where means 204b is according to an embodiment of the invention a keyboard, for example, especially when second information must be typed to the terminal. Moreover the terminal 204 comprises means 204c for encrypting, decrypting, signing and/or verifying signature of information, as well as means 204d for generating a PKI key pair including a private and public key. These means could be a dedicated or general purpose signal processor or some combination of signal processing hardware and software.

In addition the terminal 204 comprises means 204e for forming a PKCS structure according to a PKCS registration standard of said part of the certificate request info and possible second information with the public key (PKI) to be registered in a certain way as depicted elsewhere in this document. The terminal comprises also means 204f for determining a verifying code, such as a hash code, over the formed PKCS structure (or over at least part of it) including the key to be registered, and means 204g for delivering the verifying code advantageously with the public key to be registered to a registration server of a certification authority. These means also could be any of the above mentioned signal processor/processing device/software.

FIG. 4 illustrates an exemplary SIM/UICC-card 300 used in a terminal 204 of FIG. 2 for a key registration process in a WPKI environment according to an advantageous embodiment of the invention, where at least part of the functionality of terminal 204 can be performed with the SIM/UICC-card 300. The SIM/UICC-card 300 comprises according to an embodiment of the invention at least one of the following means: means 304a for receiving (only) part of the certificate request info defined on the PKCS registration standard, means 304b for receiving and/or gathering second information for example from the keyboard or other I/O-means or from the environment of the SIM/UICC-card or terminal, means 304c for encrypting, decrypting signing, and/or verifying a signature of information, as well as means 304d for generating a PKI key pair including a private and public keys, means 304e for forming a PKCS structure according to a PKCS registration standard of said part of the certificate request info and possible second information with the public key (PKI) to be registered in a certain way as depicted elsewhere in this document, means 304f for determining a verifying code over the formed PKCS structure (or over at least part of it) including the key to be registered, and means 304g for outputting the verifying code advantageously with the public key to be delivered to a registration server of a certification authority. Likewise, these various means may be embodied in signal processing hardware/software as known in the art.

FIG. 5 illustrates a block diagram of an exemplary registration server 202 for registering a key according to an advantageous embodiment of the invention, as also shown in FIG. 2, where the registration server 202 comprises means 202a for sending and generating part of the certificate request info and means 202b for sending and generating second information or at least part of it. Moreover the registration server 202 comprises means 202c for receiving a verifying code and the key to be registered, as well as means 202d for decrypting, encrypting, signing and/or verifying a signature of information. These means may also be embodied in signal processing hardware, software, or some combination of hardware and software.

In addition the registration server 202 comprises means 202e for forming a PKCS structure according to a PKCS registration standard of said part of the certificate request info and possible second information with the received public key (PKI) to be registered in a certain way as depicted elsewhere in this document, as well as means 202f for determining a verifying code over the formed PKCS structure (or over at least part of it) including the received public key (PKI) to be registered in a similar way as the terminal did. Furthermore the registration server 202 comprises means 202g for comparing the verifying codes (the first one sent by the terminal and the second one determined by the registration server itself) so that if they are identical, the registration server is adapted to register the public key using means 202h, or otherwise adapted to send an error code using means 202i.

FIG. 6A illustrates a block diagram of an exemplary computer program product 400 such as a computer readable medium for a terminal for forming a registration request in a terminal according to an advantageous embodiment of the invention. The computer program product 400 comprises following means 400a-400g, where means 404a is adapted to receive only part of the certificate request info defined on the PKCS and delivered advantageously via a first data communication connection, means 404b adapted to receive and/or gather second information for example from the keyboard or other I/O-means or from the environment of the SIM/UICC-card or terminal, means 404c adapted to encrypt, decrypt, sign and/or verify a signature of information, as well as means 404d adapted to generate a PKI key pair including a private and public keys, means 404e adapted to form a PKCS structure according to a PKCS registration standard of said part of the certificate request info and possible second information with the public key (PKI) to be registered in a certain way as depicted elsewhere in this document, means 404f adapted to determine a verifying code over the formed PKCS structure (or over at least part of it) including the key to be registered, and means 404g adapted to output the verifying code advantageously with the public key to be delivered to a registration server of a certification authority, when the computer program product is run on a data processing means, such as a terminal 204 illustrated in FIG. 4, or SIM/UICC-card illustrated in FIG. 4 or other data processing means, such as a laptop computer. In such a case, the various means may comprise various corresponding computer program code modules stored on the computer readable medium.

FIG. 6B illustrates a block diagram of an exemplary computer program product 500 such as a computer readable medium for registering a key in a registration server according to an advantageous embodiment of the invention. The computer program product 500 comprises following means 500a-500i, where means 502a is adapted to send and generate (only) part of the certificate request info, means 502b adapted to send and generate possible second information or at least part of it, means 502c adapted to receive a verifying code and the key to be registered, as well as means 502d adapted to decrypt, encrypt, sign and/or verify a signature of information, means 502e adapted to form a PKCS structure according to a PKCS registration standard of said part of the certificate request info and possible second information with the received public key (PKI) to be registered in a certain way as depicted elsewhere in this document, as well as means 502f adapted to determine a verifying code over the formed PKCS structure (or over at least part of it) including the received public key (PKI) to be registered in similar way as the terminal did, means 502g adapted to compare the verifying codes (the first one sent by the terminal and the second one determined by the computer program product server itself) so that if they are identical, the computer program product is adapted to register the public key using means 202h, or otherwise adapted to send an error code using means 202i, when said computer program product is run on a data processing means, such as a registration server 202 illustrated in FIG. 5. In such a case also, the various means may comprise various corresponding computer program code modules stored on the computer readable medium.

The invention has now been explained above with reference to the aforementioned embodiments, and several advantages of the invention have been demonstrated. It is clear that the invention is not only restricted to these embodiments, but comprises all possible embodiments within the spirit and scope of the inventive thought and the following patent claims.

Even if the delivery of a public key is described in this document, it should be noted that only information relating to the public key and essential for registering said key in the registration server may be sufficient in certain situations, whereupon the key or registration structure is not wholly delivered. Briefly one can say that only relevant information that is needed to put PKCS structure together is sent, where some information is agreed beforehand and only minimum information is delivered to the server. In addition it should be noted that even if it said in this document that a public key to be registered is delivered to a registration server, it could also be enough in a certain situation to deliver only relevant parts of said public key. Furthermore it is to be noted that the present invention is applicable in particularly when using PKCS#10 registration standards, but can also be used for other PKCS standards (as some future version of it or as new standards) mutatis mutandis.

What is claimed is:

1. A method for a secure public key infrastructure (PKI) key registration process in a wireless PKI (WPKI) environment using a public-key cryptography standards (PKCS) registration standard, where the WPKI environment comprises a registration server being in data communication with a client provided with a key pair, and where a registration request for a public key of said key pair is provided to said registration server using the PKCS registration standard, the method comprising:
   a) delivering only part of the certificate request information defined on the PKCS registration standard to the client via a first data communication connection,
   b) forming a PKCS structure by the client using
      b1) at least portion of said part of the request info received in step a) and
      b2) the public key to be registered,
   c) determining a verifying code over at least part of the PKCS structure formed in step b),
   d) signing said verifying code by the client, and
   e) delivering only the signed verifying code and the public key to said registration server for registering.

2. A method according to claim 1, wherein said PKCS registration standard is a PKCS#10 registration standard.

3. A method according to claim 1, wherein the verifying code is a hash code determined using a one-way algorithm.

4. A method according to claim 1, further comprising the step of using second information also for forming said PKCS registration structure, where said second information is also known by said registration server.

5. A method according to claim 4, further comprising the step of providing the client with at least part of said second information via a second connection separated from the first data communication connection through which the certificate request info is delivered to said client.

6. A method according to claim 4, wherein at least part of said second information is information gathered from the environment of the client.

7. A method according to claim 4, further comprising the step of transmitting said second information used for forming the registration request from the client to the registrations server on the third communication connection, if said second information is not known to the registrations server beforehand.

8. A method according to claim 1, further comprising the step of receiving said verifying code and the public key and forming a PKCS registration structure in the registration server using, said portion of said part of the request information used by the client in step b) for forming the PKCS registration structure and, the public key to be registered, whereupon a verifying code is determined over at least part of said PKCS registration structure formed in the registration server, and the public key is registered in the registration server, if the verifying code formed in the registration server is identical with the verifying code received from the client.

9. A method according to claims 4, further comprising the step of using said second information also for forming said PKCS registration structure in the registration server.

10. A method according to claim 1, wherein the client is a SIM-card, UICC-card, tamper resistance means, or a terminal, where said terminal is a mobile phone or portable computer comprising a SIM-card, UICC-card, and/or tamper resistance means.

11. A method according to claim 1, further comprising the step of generating the key pair by the client or pre-generating the key pair outside the client.

12. A method according to claim 1, wherein said second information is proof of possession or a challenge password.

13. A method according to claim 3, wherein said one-way algorithm is a SHA-1, SHA-2, MD5, RIPEMD, REPEMD-160, RIPEMD-128, RIPEMD-256, RIPEMD-320, Tiger, or WHIRLPOOL algorithm.

14. A method according to claim 1, further comprising the step of signing said verifying code and/or public key to be registered by the private key of the key pair which public key is on said PKCS registration structure.

15. A method according to claim 1, further comprising the step of triggering a certain time window during which the verifying code and the public key to be registered must be received in the registration server in order to be registered.

16. A method according to claim 15, further comprising the step of triggering said certain time window by the delivering of the part of the certificate request information.

17. A system for a secure public-key infrastructure (PKI) key registration process in a wireless PKI (WPKI) environment using a public-key cryptography standards (PKCS) registration standard, where the system comprises a registration server being in data communication with a client provided with a key pair, and where a registration request for a public key of said key pair is provided to said registration server using the PKCS registration standard, wherein
  a) the system is adapted to send only part of the certificate request information defined on the PKCS registration standard to the client via a first data communication connection,
  b) the system is adapted to form a PKCS registration structure by the client using
  b1) at least portion of said part of the request info of step a) and
  b2) the public key to be registered,
  c) the system is adapted to determine a verifying code over at least part of the PKCS registration structure formed in step b),
  d) the system is adapted to sign said verifying code by the client's key, and
  e) the system is adapted to deliver only the signed verifying code and the public key to said registration server for registering.

18. A system according to claim 17, wherein the system is adapted to deliver said verifying code and the public key to the registration server, and the system is further adapted to form a PKCS registration structure in the registration server using,
  said portion of said part of the request information used by the client in step b) for forming the PKCS registration structure and,
  the public key to be registered, whereupon
  the system is adapted to determine a verifying code over at least part of said PKCS registration structure formed in the registration server, and
  the system is adapted to register the public key in the registration server, if the verifying code formed in the registration server is identical with the verifying code determined by the client.

19. A system according to claim 17, wherein said PKCS registration standard is a PKCS#10 registration standard.

20. A system according to claim 17, wherein the client is a SIM-card, UICC-card, tamper resistance means, or a terminal, and where said terminal is a mobile phone or portable computer comprising a SIM-card, UICC-card, and/or tamper resistance means.

21. A system according to claims 17, wherein the system is adapted to generate the key pair using the client or pre-generate the key pair outside the client.

22. A registration server for a secure public-key infrastructure (PKI) key registration process in a wireless PKI (WPKI) environment using a public-key cryptography standards (PKCS) registration standard, where the WPKI environment comprises a registration server being in data communication with a client provided with a key pair, and where a registration request for a public key of said key pair is provided to said registration server using the PKCS registration standard, wherein
  a) the registration server is provided with a part of the certificate request information defined on the PKCS delivered also to the client via a first data communication connection,
  b) the registration server is adapted to receive only a signed verifying code formed by the client and a public key to be registered,
  c) the registration server is adapted to form a PKCS registration structure using
  c1) same portion of said part of the request information used also by the client, and
  c2) the received public key to be registered,
  d) the registration server is adapted to determine a verifying code by itself over at least part of the PKCS registration structure formed in step c), and
  e) the registration server is adapted to register the public key, if the verifying code formed in the registration server is identical with the signed verifying code received from the client.

23. A registration server according to claim 22, wherein the registration server is further adapted to generate and send said part of the certificate request info defined on the PKCS to the client.

24. A client for a secure public-key infrastructure (PKI) key registration process in a wireless PKI (WPKI) environment using a public-key cryptography standards (PKCS) registration standard, where the WPKI environment comprises a registration server being in data communication with said client provided with a key pair, and where a registration request for a public key of said key pair is provided to said registration server using the PKCS registration standard, wherein a) the client is adapted to receive only part of the certificate request information defined on the PKCS via a first data communication connection,
b) the client is adapted to form a PKCS structure using
b1) at least portion of said part of the request info received in step a) and
b2) the public key to be registered,
c) the client is adapted to determine a verifying code over at least part of the PKCS registration structure formed in step b),
d) the client is adapted to sign said verifying code, and
e) the client is adapted to sent only the signed verifying code and the public key to said registration server.

25. A client according to claim 24, wherein the client is a SIM-card, UICC-card, tamper resistance means, or a terminal, where the terminal is a mobile phone or portable computer comprising a SIM-card, UICC-card, and/or tamper resistance means.

26. A computer program product for a secure public-key infrastructure (PKI) key registration process in a wireless PKI (WPKI) environment using a public-key cryptography standards (PKCS) registration standard, where the WPKI environment comprises a registration server being in data communication with a client provided with a key pair, and where a registration request for a public key of said key pair is provided to said registration server using the PKCS registration standard, wherein said computer program product comprises a computer readable medium configured to
a) receive only part of the certificate request information defined on the PKCS delivered to the client via a first data communication connection,
b) form a PKCS registration structure by the client using
b1) at least portion of said part of the request info received in step a) and
b2) the public key to be registered,
c) determine a verifying code over at least part of the PKCS registration structure formed in step b) by the client,
d) sign said verifying code, and
e) output only the signed verifying code and the public key to be delivered said registration server, when said computer program product is run by the client.

27. A computer program product for a secure public-key infrastructure (PKI) key registration process in a wireless PKI (WPKI) environment using a PKCS registration standard, where the WPKI environment comprises a registration server being in data communication with a client provided with a key pair, and where a registration request for a public key of said key pair is provided to said registration server using the PKCS registration standard, wherein said computer program product comprises a computer readable medium configured to
a) be provided with a part of the certificate request information defined on the PKCS delivered also to the client via a first data communication connection,
b) receive only a verifying code formed by the client and a public key to be registered,
c) form a PKCS registration structure using
c1) same portion of said part of the request info used also by the client, and
c2) the received public key to be registered,
d) determine a verifying code by itself over at least part of the PKCS registration structure formed in step c), and
e) register the public key, if the verifying code formed in the registration server is identical with the signed verifying code received from the client, when said computer program product is run on a computer in the registration server end.

* * * * *